US012664335B2

(12) United States Patent
Kano et al.

(10) Patent No.: US 12,664,335 B2
(45) Date of Patent: Jun. 23, 2026

(54) ANALYSIS APPARATUS, ANALYSIS METHOD, AND COMPUTER PROGRAM PRODUCT

(71) Applicant: KABUSHIKI KAISHA TOSHIBA, Tokyo (JP)

(72) Inventors: Akira Kano, Kawasaki (JP); Hideaki Uehara, Yokohama (JP); Kenji Hirohata, Tokyo (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 1029 days.

(21) Appl. No.: 17/185,700

(22) Filed: Feb. 25, 2021

(65) Prior Publication Data

US 2022/0083713 A1      Mar. 17, 2022

(30) Foreign Application Priority Data

Sep. 16, 2020      (JP) ................................. 2020-155099

(51) Int. Cl.
| | |
|---|---|
| *G06F 30/27* | (2020.01) |
| *G06F 30/23* | (2020.01) |
| *G06F 119/06* | (2020.01) |
| *G06N 3/08* | (2023.01) |
| *G06N 7/01* | (2023.01) |

(Continued)

(52) U.S. Cl.
CPC .............. *G06F 30/27* (2020.01); *G06F 30/23* (2020.01); *G06N 3/08* (2013.01); *G06N 7/01* (2023.01); *G06F 2119/06* (2020.01); *G06N 3/04* (2013.01); *G06N 20/00* (2019.01)

(58) Field of Classification Search
CPC ...... G06F 30/27; G06F 30/23; G06F 2119/06; G06N 3/08; G06N 7/01; G06N 3/04; G06N 20/00
USPC .......................................................... 703/13
See application file for complete search history.

(56) References Cited

U.S. PATENT DOCUMENTS 7,653,510 B2      1/2010  Hirohata et al.

FOREIGN PATENT DOCUMENTS

| | | |
|---|---|---|
| JP | 4439533 B2 | 3/2010 |
| JP | 2019-128815 A | 8/2019 |

OTHER PUBLICATIONS

Samaniego, Esteban, et al. "An energy approach to the solution of partial differential equations in computational mechanics via machine learning: Concepts, implementation and applications." Computer Methods in Applied Mechanics and Engineering 362 (2020): 112790. (Year: 2020).*

(Continued)

*Primary Examiner* — John E Johansen
(74) *Attorney, Agent, or Firm* — Finnegan, Henderson, Farabow, Garrett & Dunner, LLP

(57) ABSTRACT

An analysis apparatus according to an embodiment includes one or more hardware processors. The one or more hardware processors: acquire pieces of input data each representing a physical quantity of a corresponding one of elements, the elements being obtained by performing discretization on an analysis area; input the pieces of input data into an estimation model; and calculate pieces of output data output by the estimation model, each of the pieces of output data being a value of an energy functional representing energy of a corresponding one of the elements.

14 Claims, 9 Drawing Sheets

(51) Int. Cl.
*G06N 3/04* (2023.01)
*G06N 20/00* (2019.01)

(56) References Cited

OTHER PUBLICATIONS

Ntalampiras, Stavros. "Detection of integrity attacks in cyber-physical critical infrastructures using ensemble modeling." IEEE Transactions on Industrial Informatics 11.1 (2014): 104-111. (Year: 2014).*

Seventekidis, Panagiotis, et al. "Structural Health Monitoring using deep learning with optimal finite element model generated data." Mechanical Systems and Signal Processing 145 (2020): 106972. (Year: 2020).*

Sam Greydanus et al., "Hamiltonian Neural Networks," arXiv:1906.01563v1 (2019).

Miles Cranmer et al., "Lagrangian Neural Networks," arXiv:2003.04630v2 (2020).

* cited by examiner

FIG.6

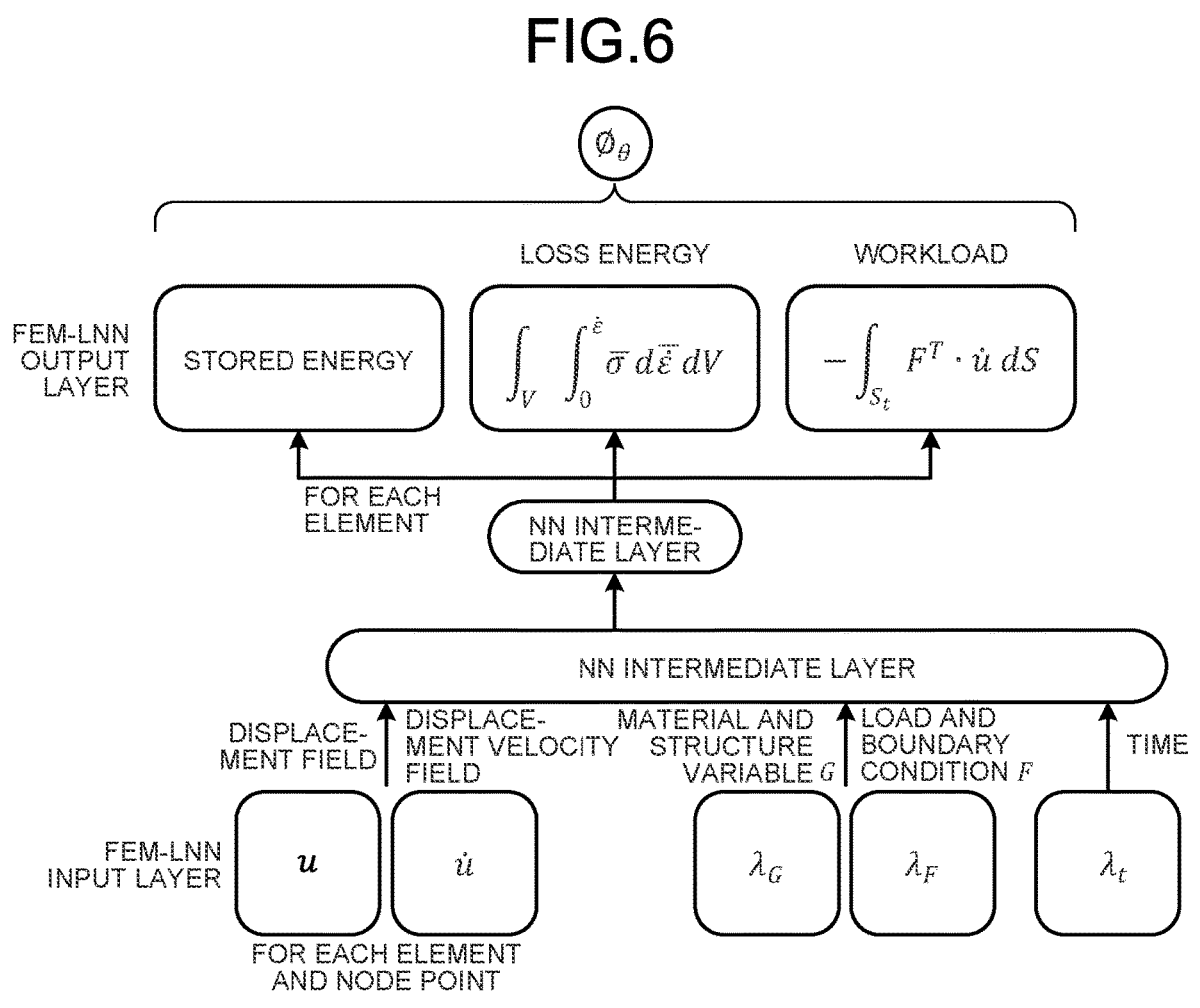

$$\emptyset_\theta$$

LOSS ENERGY                    WORKLOAD

FEM-LNN
OUTPUT
LAYER

STORED ENERGY $$\int_V \int_0^{\dot{\varepsilon}} \bar{\sigma} \, d\bar{\varepsilon} \, dV$$

$$-\int_{S_t} F^T \cdot \dot{u} \, dS$$

FOR EACH
ELEMENT

NN INTERME-
DIATE LAYER

NN INTERMEDIATE LAYER

DISPLACE-
MENT FIELD

DISPLACE-
MENT VELOCITY
FIELD

MATERIAL AND
STRUCTURE
VARIABLE $G$

LOAD AND
BOUNDARY
CONDITION $F$

TIME

FEM-LNN
INPUT LAYER $$u$$

$$\dot{u}$$

$$\lambda_G$$

$$\lambda_F$$

$$\lambda_t$$

FOR EACH ELEMENT
AND NODE POINT

Figure 9:
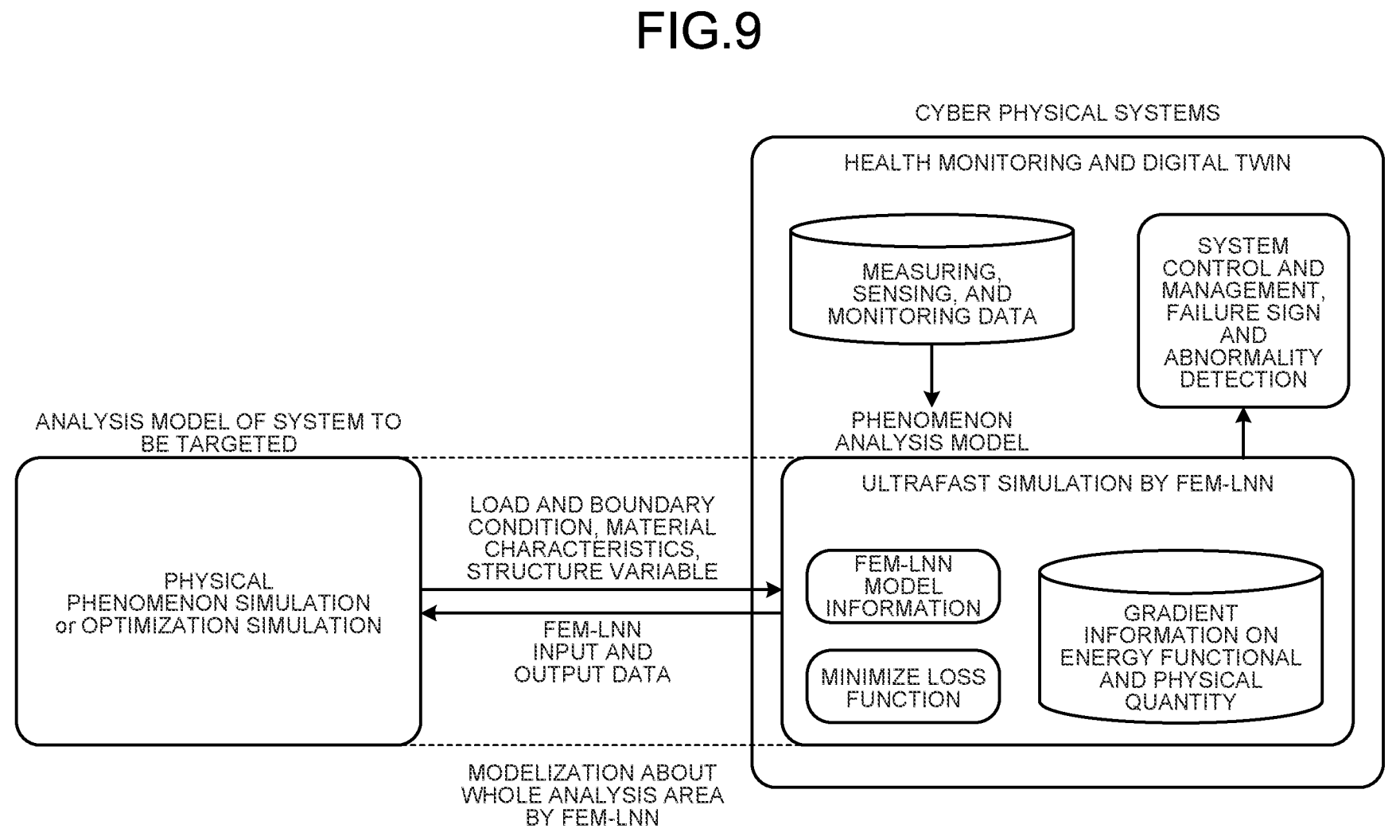

CYBER PHYSICAL SYSTEMS

HEALTH MONITORING AND DIGITAL TWIN

SYSTEM CONTROL AND MANAGEMENT, FAILURE SIGN AND ABNORMALITY DETECTION

MEASURING, SENSING, AND MONITORING DATA

PHENOMENON ANALYSIS MODEL

ULTRAFAST SIMULATION BY FEM-LNN

GRADIENT INFORMATION ON ENERGY FUNCTIONAL AND PHYSICAL QUANTITY

FEM-LNN MODEL INFORMATION

MINIMIZE LOSS FUNCTION

LOAD AND BOUNDARY CONDITION, MATERIAL CHARACTERISTICS, STRUCTURE VARIABLE

FEM-LNN INPUT AND OUTPUT DATA

MODELIZATION ABOUT WHOLE ANALYSIS AREA BY FEM-LNN

ANALYSIS MODEL OF SYSTEM TO BE TARGETED

PHYSICAL PHENOMENON SIMULATION or OPTIMIZATION SIMULATION

| CPU 51 | ROM 52 | RAM 53 |
|--------|--------|--------|

61

| COMMUNI-CATION I/F 54 |
|---|

ANALYSIS APPARATUS, ANALYSIS METHOD, AND COMPUTER PROGRAM PRODUCT

CROSS-REFERENCE TO RELATED APPLICATIONS

This application is based upon and claims the benefit of priority from Japanese Patent Application No. 2020-155099, filed on Sep. 16, 2020; the entire contents of which are incorporated herein by reference.

FIELD

An embodiment described herein relates generally to an analysis apparatus, an analysis method, and a computer program product.

BACKGROUND

There has been known a technique of estimating, in industrial systems and infrastructure facilities, physical quantity related to a degree of abnormality or a degree of damage through a three-dimensional physical simulation or a non-linear dynamics simulation using sensing data of health monitoring or analysis conditions of structure design optimization.

However, in the conventional technique, it may take for many hours (for example, several hours or more) to estimate physical quantity. In this case, it may become difficult to take measures such as emergency shutdown of a system and structure design optimization before problems of reliability and safety are caused.

BRIEF DESCRIPTION OF THE DRAWINGS

FIG. 6 is a diagram illustrating a structure example of the FEM-LNN model;

FIG. 7 is a diagram for explaining a difference in each gradient used in a loss function;

FIG. 9 is a diagram illustrating an application example of the embodiment;

FIG. 10 is a diagram illustrating an application example of the embodiment; and FIG. 11 is a hardware configuration diagram of the analysis apparatus according to the embodiment.

DETAILED DESCRIPTION

An analysis apparatus according to an embodiment includes one or more hardware processors. The one or more hardware processors are configured to: acquire pieces of input data each representing a physical quantity of a corresponding one of elements, the elements being obtained by performing discretization on an analysis area; input the pieces of input data into an estimation model; and calculate pieces of output data output by the estimation model, each of the pieces of output data being a value of an energy functional representing energy of a corresponding one of the elements.

A preferable embodiment of an analysis apparatus according to the present disclosure will now be described in detail with reference to the accompanying drawings.

The present embodiment describes an example of an analysis method for estimating physical quantity (such as a displacement field and a displacement velocity field) related to a failure sign and abnormality detection of a system to be targeted (target system) from sensing data (data on which measuring, sensing, or monitoring is performed) when health monitoring and digital twin are performed in cyber physical systems.

Specifically, by introducing a discretization numerical calculation method of a partial differential equation and Lagrangian neural networks serving as a machine learning method, conversion from sensing data required for health monitoring and the like to temporally and spatially physical quantity distribution is speeded up and performed with high accuracy. Applicable techniques are not limited to health monitoring and digital twin.

Examples of the discretization numerical calculation method include a finite element method (FEM), a finite volume method, and a difference method. The following mainly describes an example of using a Lagrangian neural network model utilizing the FEM (hereinafter referred to as an FEM-LNN model).

Figure 1:
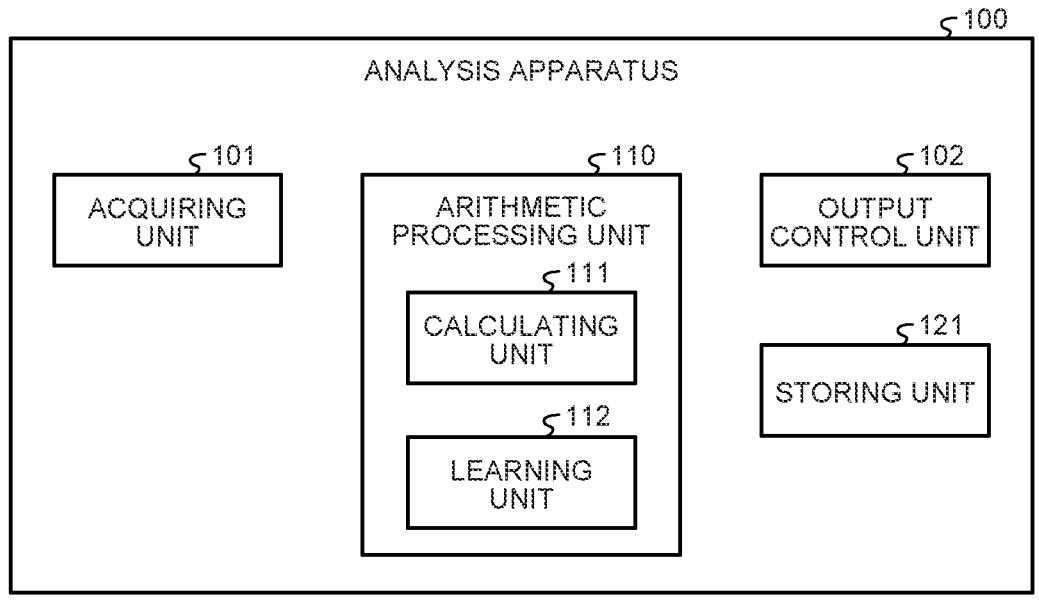
FIG. 1 is a block diagram illustrating an analysis apparatus according to an embodiment.

FIG. 1 is a block diagram illustrating an example of the configuration of an analysis apparatus 100 according to the present embodiment. As illustrated in FIG. 1, the analysis apparatus 100 includes an acquiring unit 101, an arithmetic processing unit 110, an output control unit 102, and a storing unit 121.

The acquiring unit 101 acquires various kinds of data used in the analysis apparatus 100. A method for acquiring data may be any method. For example, a method for acquiring data by receiving the data from an external apparatus connected through a network and a method for acquiring data by reading the data stored in a storage medium are applicable.

The acquiring unit 101 acquires, for example, pieces of input data to be input into an FEM-LNN model, and learning data used for learning the FEM-LNN model. Each of the pieces of input data represents a physical quantity of a corresponding one of elements that are obtained by performing discretization on an analysis area.

Figure 2:
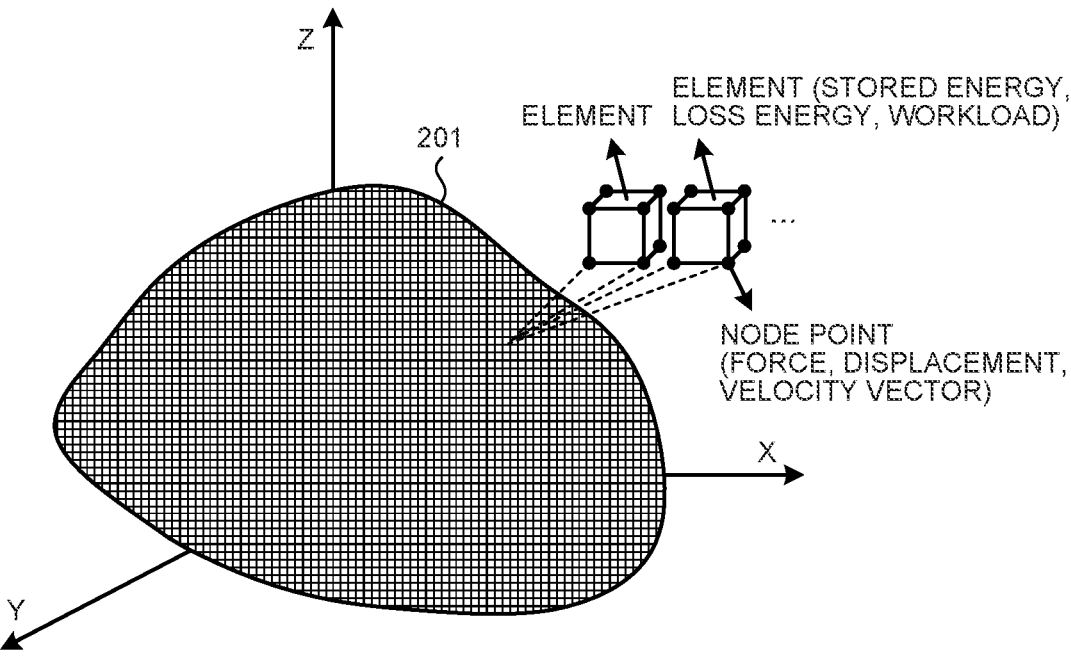
FIG. 2 is a diagram illustrating an example of elements included in an analysis area.

FIG. 2 is a diagram illustrating an example of elements included in an analysis area. Each element corresponds to information obtained by performing spatial discretization on an analysis area 201 surrounded by a curved surface. A node point is a point on a multidimensional space (three-dimensional space in FIG. 2) defining each element.

Hereinafter, a spatial displacement of each node point in the analysis area 201 is denoted as u. A differential of u corresponds to displacement velocity (velocity vector). Hereinafter, adding a dot on a variable represents a differential of the variable. For example, the displacement velocity is represented by a sign of u on which a dot is added.

In the present embodiment, an energy functional is calculated for each element. For example, the energy functional is represented by stored energy, loss energy, and a workload as shown in Expression (1).

$$\emptyset = \text{Elastic energy} + \int_V \int_0^{\bar{\varepsilon}} \sigma d\bar{\varepsilon} dV - \int_{S_t} F^T \cdot \dot{u} \, dS \qquad (1)$$

In Expression (1), $\sigma$ denotes an equivalent stress, $\varepsilon$ denotes an equivalent strain, F denotes an external force vector acting on a boundary, V denotes a volume of an object, and S denotes a surface area. The second term of Expression (1) corresponds to the integral of equivalent stress and an increment of equivalent strain rate. The third term of Expression (1) corresponds to work done by an object to an external force (product of an external force vector and velocity).

Referring back to FIG. 1, when the present embodiment is applied to health monitoring, the acquiring unit 101 may further acquire sensing data of the health monitoring as input data.

Sensing data corresponds to data indicating, for example, temperature, acceleration, a displacement, current, voltage, oscillation, and strain. A sensor detecting these sensing data is disposed at, for example, a predetermined number of sample points of a structure to be analyzed.

Sensing data may be performance characteristics of a structure to be analyzed. For example, when an object to be analyzed is an electronics mounting board, performance characteristics are the following data.

Signal transmission characteristics between parts

Noise characteristics

Heat dissipation characteristics of a cooling structure (including a housing)

Use frequency

Component performance

Fan rotation frequency

Remaining battery amount

Component load rate

Performance characteristics can be acquired by, for example, a profiling tool communicating with a basic input/output system (Bios) and the like or a monitoring tool.

Sensing data corresponds to a load condition. The acquiring unit 101 may acquire a design variable of a structure to be analyzed as well as the sensing data. The design variable corresponds to information indicating, for example, a boundary condition, material characteristics, and structure variables (such as a shape and size of a structure). Hereinafter, the sensing data and the design variable are referred to as condition data.

The arithmetic processing unit 110 performs an arithmetic operation using an FEM-LNN model on input data acquired by the acquiring unit 101, and estimates physical quantity related to abnormality detection and the like. The arithmetic processing unit 110 includes a calculating unit 111 and a learning unit 112.

The calculating unit 111 calculates, from pieces of acquired input data, output data representing physical quantity that can be used for abnormality detection and the like. For example, the calculating unit 111 inputs pieces of input data into an estimation model, and calculates pieces of output data output by the estimation model. Each of the pieces of output data indicates an estimated value of an energy functional representing energy of a corresponding one of the elements that are obtained by performing discretization on an analysis area. The estimation model can be formed as a statistical model, a probability model, and a machine learning model. The estimation model is not limited to neural network models such as an FEM-LNN model, and may be a hierarchical Bayesian model and the like.

The calculating unit 111 may further calculate an index representing abnormality of an analysis area by using the output data.

For example, when the analysis apparatus 100 detects a sign and abnormality related to deterioration and damage of systems in power electronics, industrial equipment, energy equipment, and infrastructure facilities, the calculating unit 111 can estimate, from sensing data, temporal and spatial distribution (a displacement field and a velocity field) of structural deformation to be targeted, and a stress-strain field and a velocity field thereof by an FEM-LNN model.

The calculating unit 111 can utilize a shape function from, for example, a displacement field and a displacement velocity field, and calculate a strain field and a stress field so as to satisfy a compatibility condition (integrable condition) of strain. The calculating unit 111 extracts, from the estimated displacement field and displacement velocity field, an inelastic strain range that is an index of deterioration and damage in a stress-strain concentration area, and calculates fatigue life distribution and a breakage risk. By using the calculation result, it is possible to detect abnormality and failure signs.

The learning unit 112 learns an estimation model used by the arithmetic processing unit 110. The learning unit 112 uses learning data acquired by the acquiring unit 101 so as to learn an FEM-LNN model. For example, the learning unit 112 learns an estimation model to minimize a difference between a gradient of output data and a gradient of correct answer data.

The output control unit 102 controls output of various kinds of data processed by the analysis apparatus 100. For example, the output control unit 102 outputs, to an output apparatus such as a display apparatus, output data obtained by an estimation model, or a calculated index of abnormality and the like.

The units described above (the acquiring unit 101, the arithmetic processing unit 110, and the output control unit 102) is implemented by, for example, one or more hardware processors. For example, each of the units may be implemented by causing the processor, such as a central processing unit (CPU), to execute a computer program, in other words, software. Each of the units may be implemented by a processor such as a dedicated integrated circuit (IC), in other words, hardware. The units may be implemented with a combination of software and hardware. When two or more processors are used, each processor may implement one of the units, or may implement two or more of the units.

The storing unit 121 stores various kinds of data used for various kinds of processing performed by the analysis apparatus 100. For example, the storing unit 121 stores input data acquired by the acquiring unit 101, an arithmetic operation result by the arithmetic processing unit 110, and the like.

The storing unit 121 can be formed of any storage media that are commonly used such as a flash memory, a memory card, a random access memory (RAM), a hard disk drive (HDD), and an optical disk.

Figure 3:
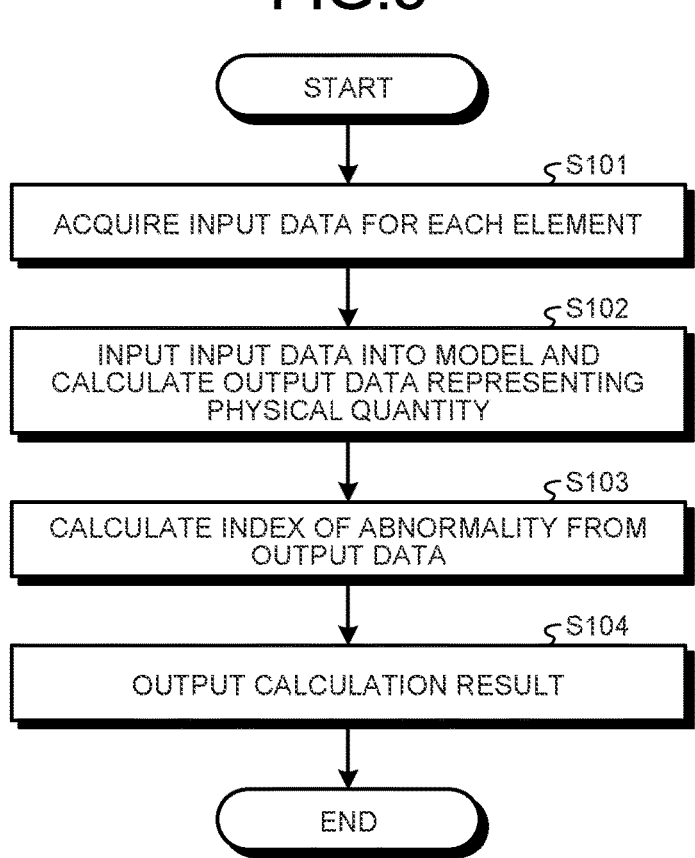
FIG. 3 is a flowchart of analysis processing in the embodiment.

The following describes analysis processing performed by the analysis apparatus 100 according to the present embodiment formed in this manner. FIG. 3 is a flowchart illustrating an example of analysis processing in the present embodiment.

The acquiring unit 101 acquires pieces of input data for elements that are obtained by performing discretization on an analysis area (step S101). The calculating unit 111 inputs the input data into an estimation model, and calculates output data representing physical quantity (step S102). The calculating unit 111 calculates an index of abnormality by using the output data (step S103). The output control unit 102 displays a calculation result on, for example, a display apparatus (step S104), and ends the analysis processing.

Figure 4:
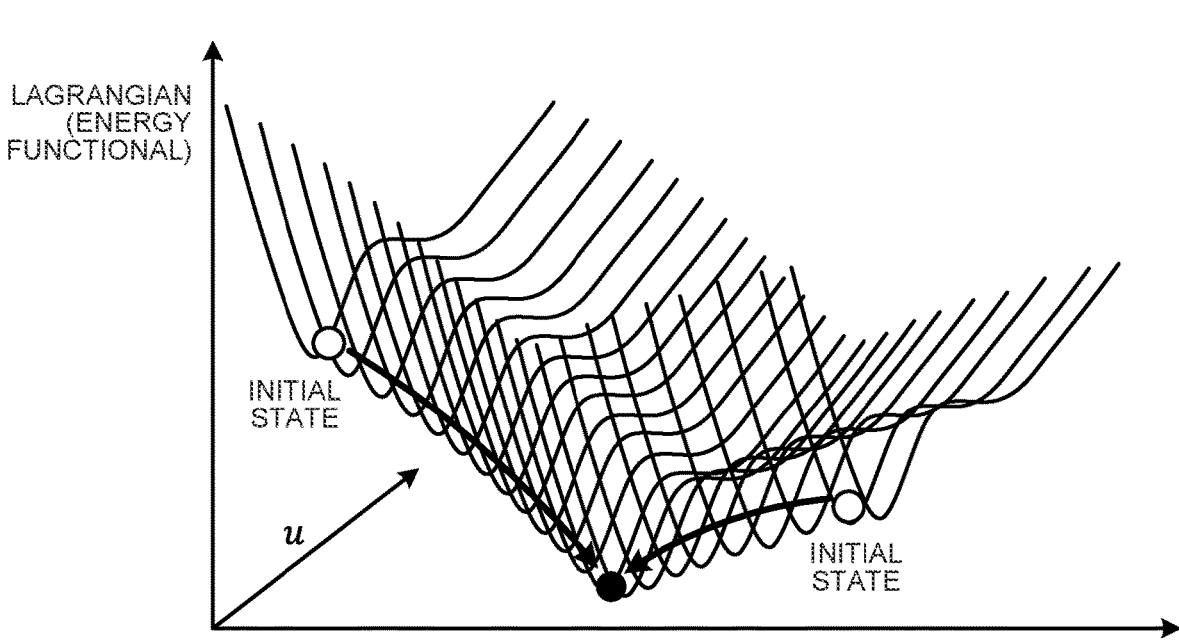
FIG. 4 is a diagram for explaining a concept of analysis using a finite element method-Lagrangian neural network (FEM-LNN) model.

The following describes details of an FEM-LNN model. FIG. 4 is a diagram for explaining a concept of analysis using an FEM-LNN model. From an analogy with the variation principle, in the case of continuum dynamics simulation (inelastic stress simulation and the like), an energy functional being output data of an FEM-LNN model is represented by stored energy, loss energy, and a workload for each of discretized elements. A displacement field and a displacement velocity field (a strain field and a strain rate field) of the inelastic stress simulation are determined as a route (dynamically admissible velocity field) for minimizing the total sum of these energy functionals by the variation principle. Arrows depicted in FIG. 4 indicate an example of a route from an initial state, which is determined to minimize the total sum of energy functional.

An FEM-LNN model can be formed as below.

(S1) Definition of FEM-LNN Model:

A displacement field and a displacement velocity field that are temporally and spatially discretized are defined as input data to a model. In this case, condition data may be added as the input data. An energy functional of each element in a target system is defined as output data of the model. In this case, a displacement field and a displacement velocity field at a next time step (a next time point) may be added as output.

A model (conversion model) that converts input data into output data or a model (estimation model) that estimates output data from input data is defined. In the case of a neural network, examples of parameters defining a model include the number of layers, the number of components in each layer, and a structure of an activating function in each component. In the case of a hierarchical Bayesian model, examples of parameters defining a model include a latent variable of an intermediate layer, data distribution, preliminary distribution, and a structure of a hyper-parameter.

(S2) Preparation for Learning Data of FEM-LNN model:

A partial differential equation describing a target system is discretized, and an analysis condition related to condition data is defined. For input data for learning, a displacement field, a displacement velocity field, an energy functional, and a gradient of the energy functional are numerically calculated at every time step for each discretized element and node point. A result of the numerical calculation is prepared as correct answer data for calculating a loss function in an FEM-LNN model. In this case, a numerical value analysis result of performing a parameter survey on condition data may be defined as correct answer data. Learning data including input data and correct answer data is used in learning processing.

(S3) Learning of FEM-LNN Model:

An energy functional approximation model (parameter θ) is created by an FEM-LNN model.

A scalar value $\phi_\theta$ of an energy functional, and a displacement field and a displacement velocity field at a next time step are output to input data included in learning data by the FEM-LNN model. The sign $\phi_\theta$ represents a value of an energy functional output by the FEM-LNN model defined by the parameter θ.

Gradients represented by the following Expressions (2) and (3) are calculated by using the FEM-LNN model.

$$\frac{\partial \phi_\theta}{\partial u} \tag{2}$$

$$\frac{\partial \phi_\theta}{\partial u} \tag{3}$$

A temporal differentiation of a displacement field and a displacement velocity field at a next time step is calculated using the FEM-LNN model.

Parameters of the FEM-LNN model are learned so as to minimize a loss function using an energy functional, a gradient of a displacement field, and a gradient of a displacement velocity field.

Figure 5:
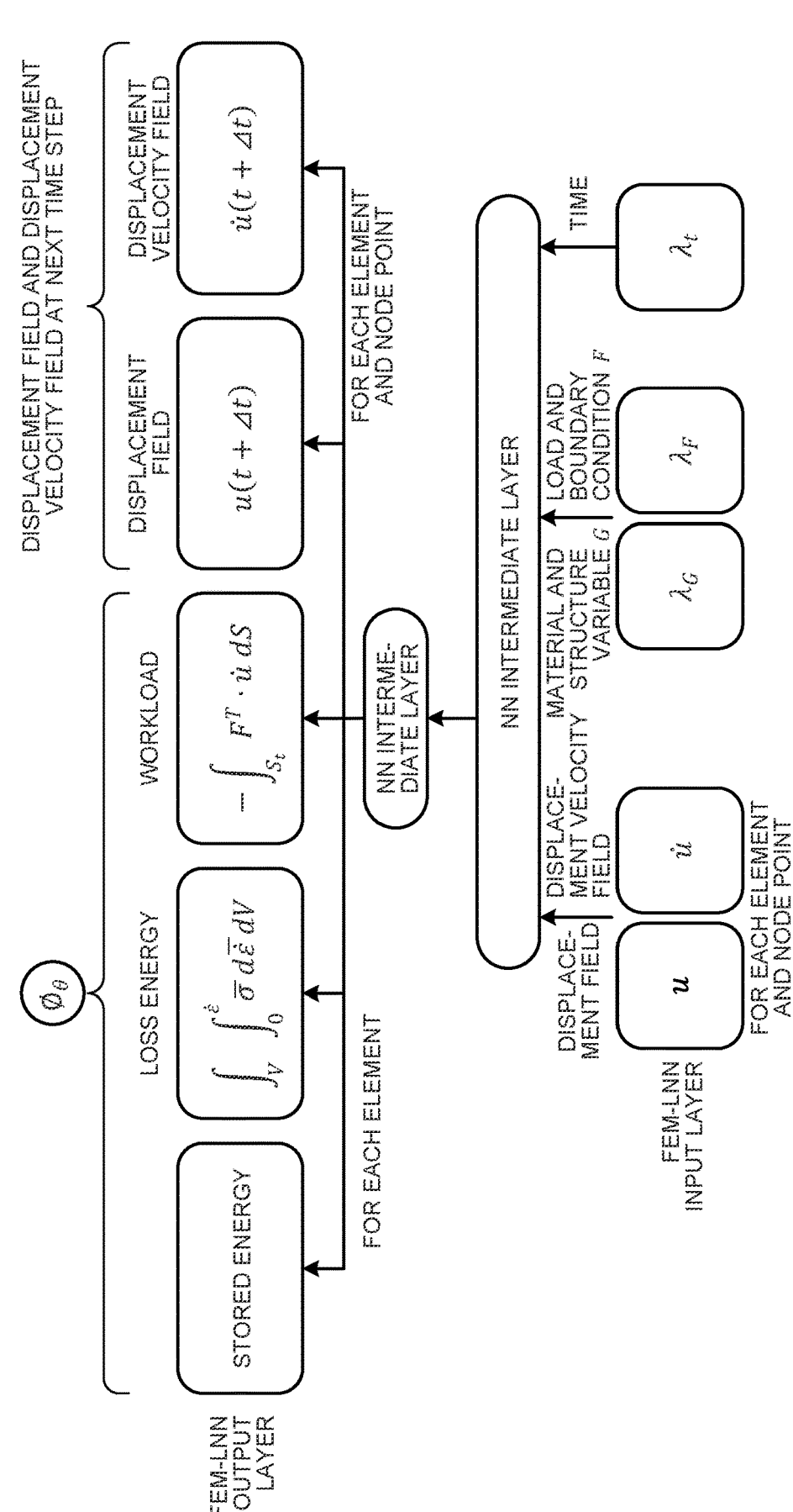
FIG. 5 is a diagram illustrating a structure example of the FEM-LNN model.

The following describes a structure example of an FEM-LNN model. FIG. 5 is a diagram illustrating a structure example N1 of the FEM-LNN model. The structure example N1 is an example of the structure where both an energy functional (stored energy, loss energy, and a workload) and a displacement field and a displacement velocity field at a next time step are included in output data. FIG. 6 is a diagram illustrating a structure example N2 of the FEM-LNN model. The structure example N2 is an example of the structure where only an energy functional is included in output data.

In the case that output data includes only an energy functional, a displacement field and a displacement velocity field at a next time step are calculated by performing the estimation with the variation principle from the energy functional in the output of an FEM-LNN model.

The sign $\lambda_G$ indicates condition data with respect to material characteristics and a structure variable. The sign $\lambda_F$ indicates condition data with respect to a load condition and a boundary condition. The sign $\lambda t$ indicates condition data about time. Part of these condition data may be input.

As illustrated in FIG. 5, an FEM-LNN model in the structure example N1 includes an input layer, two intermediate layers, and an output layer. The number of the intermediate layers is not limited to two, and may be one or three or more.

To the input layer, a displacement field and a displacement velocity field for each element and for each node point, and condition data $\lambda$ are input as input data. The output layer outputs an energy functional for each element, and a displacement field and a displacement velocity field at a next time step for each element and for each node point as output data.

The following describes a loss function used for learning an FEM-LNN model.

The loss function is defined, for example, as below.

A function capable of minimizing a difference between a gradient calculated from the FEM-LNN model and a gradient of correct answer data that is a preliminary FEM analysis result (calculated for each discretized element and discretized node point).

Figure 7:
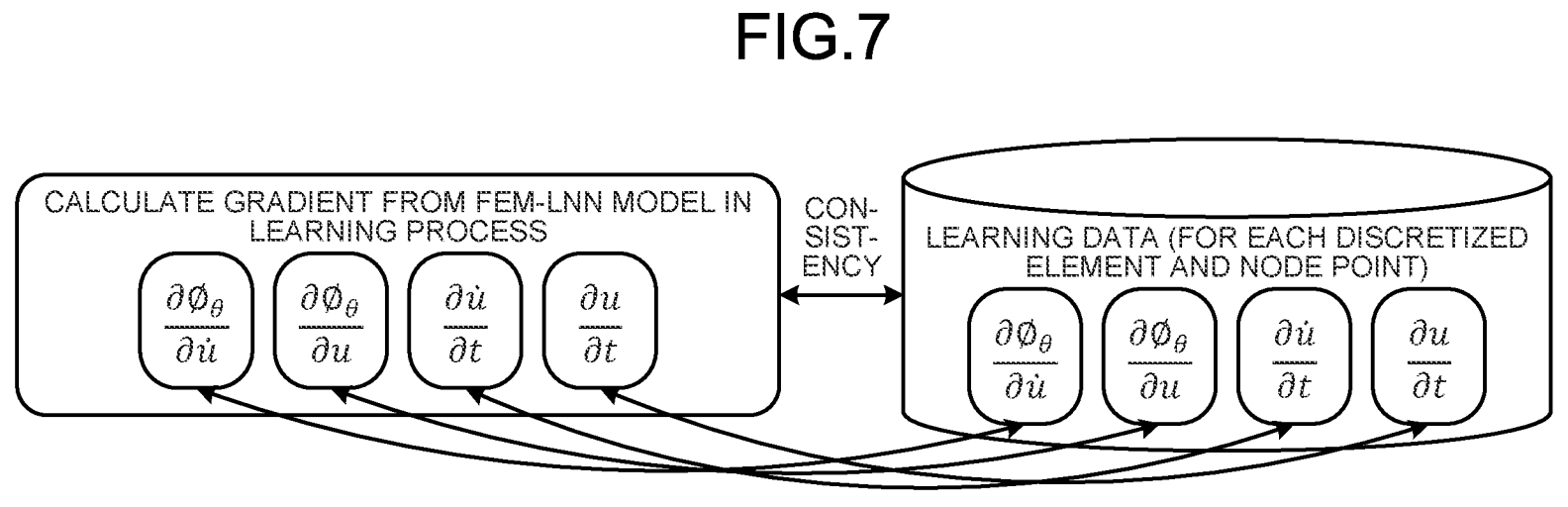

FIG. 7 is a diagram for explaining a difference in each gradient used in a loss function. As illustrated in FIG. 7, gradients include a partial differential about a displacement field of a scalar value $\phi_\theta$ of an energy functional, a partial differential about a displacement velocity field of the scalar value $\phi_\theta$ of the energy functional, a partial differential about a time of the displacement velocity field, and a partial differential about a time of the displacement field. For each of these gradients, a difference between a value of a gradient (gradient value) calculated from an FEM-LNN model and a gradient value of correct answer data is calculated.

A loss function corresponds to, for example, the total sum of the square sum of a difference between gradient values of each element or each node point in an analysis area. A gradient value of correct answer data corresponds to, for example, aggregated data of a gradient value calculated for each discretized element or discretized node point. A gradient value of the correct answer data may be calculated using the following relational models.

Relational models such as an approximation model related to an energy functional in which a displacement field is defined as a variable Relational models such as an approximation model related to a displacement field in which a time is defined as a variable A limitation related to an energy functional may be added to a loss function. For example, there is a loss function based on a limitation condition that a workload done by a target system is equal to the sum of stored energy and loss energy.

A loss function may include a function capable of minimizing a difference between an energy functional value calculated from an FEM-LNN model and an energy functional value acquired from a preliminary FEM analysis result about an energy functional.

For the structure (the structure example N1) where output data of an FEM-LNN model includes physical quantity such as a displacement and displacement velocity, a function capable of minimizing a difference between a value calculated from the FEM-LNN model and a value acquired from a preliminary FEM analysis result about physical quantity such as a displacement and displacement velocity may be added as a loss function. A weight coefficient of each term in the sum of each of these loss functions may be changed.

A chain rule of a partial differential related to condition data λ represented by the following Expressions (4) and (5) may be applied to a gradient related to a displacement field or a displacement velocity field of an energy functional in a loss function.

$$\frac{\partial \phi_\theta}{\partial \lambda} \frac{\partial \lambda}{\partial \dot{u}} \tag{4}$$

$$\frac{\partial \phi_\theta}{\partial \lambda} \frac{\partial \lambda}{\partial u} \tag{5}$$

Partial differential data related to condition data λ of an energy functional and partial differential data related to a displacement field and a displacement velocity field of the condition data λ are preliminarily prepared as learning data (correct answer data). In learning of an FEM-LNN model, partial differential data related to condition data λ of an energy functional (the following Expression (6)), partial differential data related to a displacement field of the condition data λ (the following Expression (7)), and partial differential data related to a displacement velocity field of the condition data λ (the following Expression (8)) are also calculated.

$$\frac{\partial \phi_\theta}{\partial \lambda} \tag{6}$$

$$\frac{\partial \lambda}{\partial \dot{u}} \tag{7}$$

$$\frac{\partial \lambda}{\partial u} \tag{8}$$

A loss function may include, about partial differential data related to condition data λ of an energy functional and partial differential data related to a displacement field and a displacement velocity field of the condition data λ, a gradient estimated from an FEM-LNN model and a loss function related to the consistency of preliminary learning data.

Figure 8:
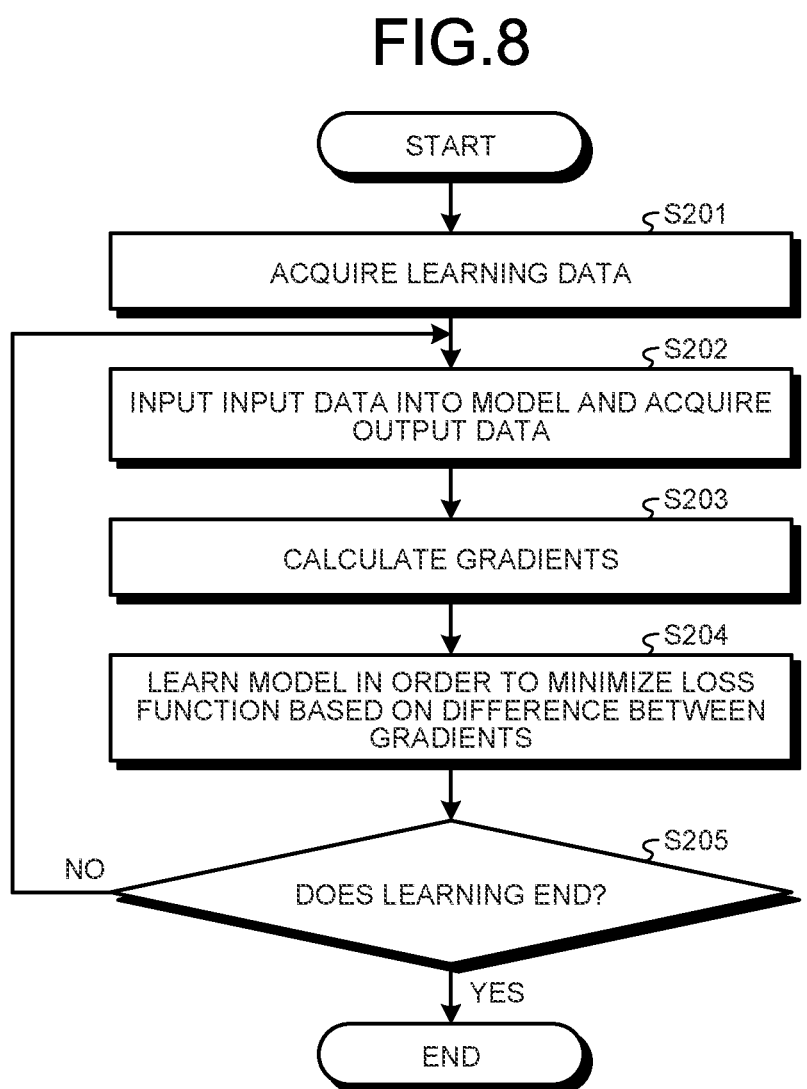
FIG. 8 is a flowchart of learning processing in the embodiment.

The following describes a flow of learning processing of an FEM-LNN model performed by the analysis apparatus 100 according to the present embodiment. FIG. 8 is a flowchart illustrating an example of learning processing in the present embodiment.

The acquiring unit 101 acquires learning data used for learning (step S201). For example, the acquiring unit 101 acquires learning data prepared in the procedures (S2) described above.

The calculating unit 111 inputs input data included in the acquired learning data into an FEM-LNN model, and obtains output data output by the FEM-LNN model (step S202). For example, the output data includes a value of an energy functional, and a displacement field and a displacement velocity field at a next time step. The calculating unit 111 calculates gradients for the value of the energy functional and for the displacement field and the displacement velocity field (step S203).

The learning unit 112 learns the FEM-LNN model so as to minimize a loss function based on a difference between the calculated gradient and a gradient of correct answer data included in the learning data (step S204).

The learning unit 112 determines whether the learning ends (step S205). For example, the learning unit 112 determines the end of the learning depending on whether a difference between gradients becomes smaller than a threshold value, whether the number of times of the learning reaches an upper limit, and the like.

When the learning does not end (No at step S205), the process goes back to the processing at step S202 and the processing is repeated on new learning data. When the learning is determined to end (Yes at step S205), learning processing ends.

As described above, in the present embodiment, an energy functional is integrated into an output layer of a neural network with the idea based on the variation principle of utilizing Lagrangian of an energy functional formed of each element of discretization. The FEM-LNN model is learned to make gradients of a displacement field and a displacement velocity field of Lagrangian consistent with a temporal change in the displacement field and the displacement velocity field (such as the consistency with a result set of a numerical experiment on which a physical phenomenon simulation is preliminarily performed). With the FEM-LNN model learned in this manner, an ultrafast simulation technique utilized even for a time-dependent physical phenomenon can be implemented.

When performing an ultrafast simulation based on an FEM-LNN model, a limitation that the sum of stored energy and loss energy of output in the FEM-LNN model becomes equal to a workload may be established, and a combination of input data may be preliminarily selected. Alternatively, a combination of input and output data of an ultrafast simulation may be preliminarily selected.

Figure 10:
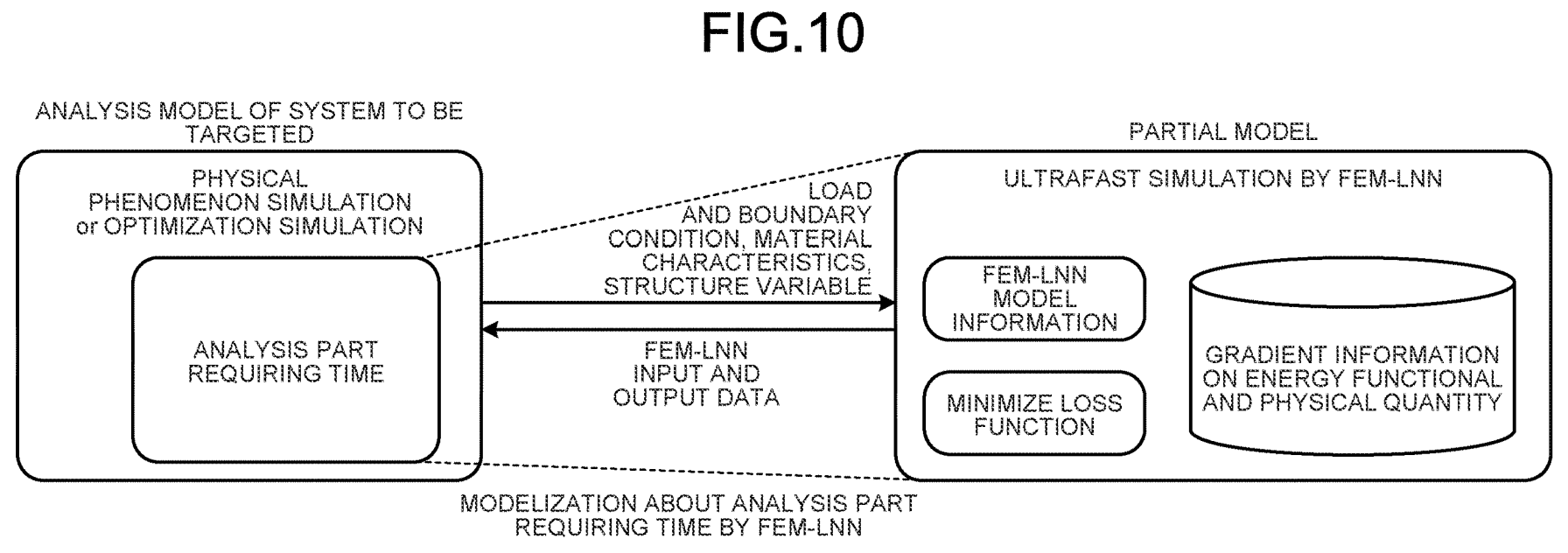

FIGS. 9 and 10 are diagrams illustrating application examples of the present embodiment. FIG. 9 illustrates an example of applying the present embodiment to the whole area to be analyzed. An analysis model of a system to be targeted (target system) is a model for a physical phenomenon simulation or an optimization simulation. As a phenomenon analysis model, an estimation model such as an FEM-LNN model of the present embodiment is applied.

FIG. 10 illustrates an example of applying the present embodiment to, among an area to be analyzed (whole area), only a part of the area taking a lot of time for a simulation such as FEM. As a model applied to a part of the area (partial model), an estimation model such as an FEM-LNN model of the present embodiment is applied. In this case, the analysis apparatus 100 may include an interface (data acquiring unit) that exchanges condition data (such as a boundary displacement and a load condition) with a simulation of the whole area.

Modification Examples

While the example applied to analysis of a continuum dynamics problem has been described, applicable analysis processing is not limited to this example. For example, the technique of the present embodiment can be applied to analysis of the following physical phenomena described with a mathematical model of a partial differential equation.

Electromagnetic field analysis

Coupled analysis of a structure and a magnetic field

Problem of Ginzburg-Landau phenomenon (phase transition phenomenon analysis such as a superconducting phenomenon)

Device simulation (such as electron density and hole density behavior analysis of a semiconductor)

The following describes an energy functional used for each analysis.

(A1) Energy Functional used for Electromagnetic Field Analysis: the following Expression (9)

$$\phi = \int_{\Omega}\left(\int_t (-W_w + W_j)dt + \int_0^B dB \cdot H + \int_0^D dD \cdot E\right)dv - \int_{d\Omega}\int_t (S \cdot n)dt\,ds \tag{9}$$

External work caused by a displacement induced inductive current: $W_w = J \times (u_{,t} \times B)$ [W]

Exothermic energy: $W_j = J^2/\sigma$ [W]

Poynting vector: $S = E \times H$ [W/m$^2$]

Magnetic flux density: B [T]

Magnetic field: H [A/m]

Electric flux density: D [Cm$^{-2}$]

Electric field: E [N/C]

Time: t [s]

Volume: $\Omega$ [m$^3$]

Surface area: $d\Omega$ [m$^2$]

Outward unit normal vector: n (A2) Energy Functional used for Coupled Analysis of Structure and Magnetic Field: the following Expression (10)

$$\phi = \int_{\Omega}(E_e + E_k + \int_t (W_c - W_F)dt + E_j + E_{mf})dv - \int_{d\Omega}\int_t (S \cdot n + F \cdot n)dt\,ds \tag{10}$$

Elastic strain energy: $E_k = \sigma_{ij} \times \varepsilon_{ij}/2$ [J]

Kinetic energy: $E_e = \rho u_{i,t} \times u_{i,t}/2$ [J]

Dissipation energy caused by structural damping: $W_c = \alpha \times \rho u_{i,t} \times u_{i,t} + \beta \times \sigma_{ij} \times \varepsilon_{ij}$ [W]

External work caused by an eddy current and the like of a coil: $W_F = F_i \times u_{i,t}$ [W]

Displacement: u [m]

Stress: $\sigma$ [Pa]

Density: $\rho$

Strain: $\varepsilon$

Coefficient of Rayleigh damping: $\alpha$ [s$^{-1}$]

Coefficient of Rayleigh damping: $\beta$ [s]

Force in the i direction: $F_i$ (A3) Ginzburg-Landau Equation: the following Expressions (11) ("i" in Expression (11) represents an imaginary number) and (12)

$$\frac{\partial \psi}{\partial t} = -\left(\frac{i}{\kappa}\nabla + A\right)^2 \psi + \psi - |\psi|^2 \psi \tag{11}$$

$$\sigma \frac{\partial A}{\partial t} = \frac{1}{2i\kappa}(\psi^*\nabla\psi - \psi\nabla\psi^*) - |\psi|^2 A - \nabla \times \nabla \times A \tag{12}$$

Energy functional used in the Ginzburg-Landau equation: the following Expression (13)

$$\phi = \int_{\Omega}(\mathcal{H}\,sup + \mathcal{H}\,mag + \mathcal{H}\,int)dv \tag{13}$$

Superconductive energy: the following Expression (14)

$$\mathcal{H}sup = \frac{1}{\kappa^2}|\nabla\psi|^2 - |\psi|^2 + \frac{1}{2}|\psi|^4 \tag{14}$$

Energy caused by a magnetic field: the following Expression (15)

$$\mathcal{H}\,mag = (Ba - \nabla \times A)^2 \tag{15}$$

Interaction energy: the following Expression (16)

$$\mathcal{H}int = \frac{i}{\kappa}A[(\nabla\psi)\psi^* - \psi(\nabla\psi^*)] + |A|^2|\psi|^2 \tag{16}$$

External magnetic field: Ba

Vector potential of a magnetic field: A

Ginzburg-Landau parameter: $\kappa$

Order parameter representing a superconductive state: $\psi$

Electric conductivity of a normal conductive state: $\sigma$ (A4) Device Simulation:

Helmholtz free energy F of an energy functional used for crystal defect behavior analysis in a device simulation of a semiconductor is represented as shown in Expression (17).

$$F = \int_{\Omega}(f_{chem} + f_{ssf} + f_{elast} + f_{grad} + f_{cryst})dx - W \tag{17}$$

Chemical potential: $f_{chem}$

Defect energy: $f_{ssf}$

Elastic strain energy: $f_{elast}$

Gradient energy: $f_{grad}$

Crystallographic energy: $f_{cryst}$

Workload from external stress: W

In an area $\Omega$ to be targeted with respect to a position vector x, by taking the total sum (integral) of energy functionals f of respective discretized elements, the whole energy functional can be obtained.

It takes time to analyze behavior of electron density and hole density distribution in a device simulation of a semiconductor. Thus, it is possible to apply an FEM-LNN model to only behavior analysis of electron density and hole density distribution for chemical potential calculation in crystal defect behavior analysis (example in FIG. 10 described above).

A chemical potential $f_{chem}$ is calculated by the following Expressions (18) and (19).

$$f_{chem} = \mu(\phi) \tag{18}$$

$$\mu = \mu_n + \mu_p \tag{19}$$

11

Chemical potential function: μ

State quantity for the presence or absence of crystal defect: φ

Chemical potential functions of electron density and hole density can be calculated by the following Expressions (20) and (21).

$$\mu_n = \int_\Omega \int_{E_i}^{\infty} (E - E_i) D_e(E) F_n(E) dE dx \qquad (20)$$

$$= \int_\Omega n \left( E_c - E_i + \frac{3}{2} k_B T \right) dx$$

$$\mu_p = \int_\Omega \int_{\infty}^{E_i} (E_i - E) D_h(E) F_p(E) dE dx \qquad (21)$$

$$= \int_\Omega p \left( E_i - E_v + \frac{3}{2} k_B T \right) dx$$

Electron density in the electric field E: $D_e(E)$

Hole density in the electric field E: $D_h(E)$

Fermi-Dirac distribution function of electrons: $F_n(E)$

Fermi-Dirac distribution function of holes: $F_p(E)$

Electron density: n

Hole density: p

Boltzmann constant: $k_B$

Temperature: T

Conduction band: $E_c$

Valence band: $E_v$

Intrinsic semiconductor band: $E_i$

Electron density distribution and hole density distribution can be obtained by self-consistently solving a Boltzmann equation, a Poisson equation, and a current continuity equation.

In this manner, the analysis apparatus of the present embodiment can estimate physical quantity that can be used for estimation of a degree of abnormality, a degree of damage, or the like at a faster pace.

The following describes the hardware configuration of the analysis apparatus according to the present embodiment with reference to FIG. 11. FIG. 11 is an explanatory diagram illustrating an example of the hardware configuration of the analysis apparatus according to the present embodiment.

The analysis apparatus according to the present embodiment includes a control apparatus such as a CPU 51 and, a storage apparatus such as a read only memory (ROM) 52 and a RAM 53, a communication interface (I/F) 54 that is connected to a network so as to perform communication, and a bus 61 that connects each unit to each other.

A computer program executed by the analysis apparatus according to the present embodiment is preliminarily incorporated in the ROM 52 and the like so as to be provided.

The computer program executed by the analysis apparatus according to the present embodiment may be a file in an installable format or in an executable format, and be recorded in a non-transitory computer-readable recording medium, such as a compact disc read only memory (CD-ROM), a flexible disk (FD), a compact disc recordable (CD-R), or a digital versatile disc (DVD), so as to be provided as a computer program product.

Furthermore, the computer program executed by the analysis apparatus according to the present embodiment may be stored in a computer connected to a network such as the Internet and be downloaded over the network so as to be provided. The computer program executed by the analysis apparatus according to the present embodiment may be provided or distributed over a network such as the Internet.

The computer program executed by the analysis apparatus according to the present embodiment enables a computer to function as each unit of the analysis apparatus described above. After the CPU 51 reads the computer program on a main storage apparatus from a computer-readable storage medium, this computer can execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An analysis apparatus comprising:

a plurality of sensors disposed at a plurality of sample points of a structure to be analyzed and configured to detect sensing data of the structure to be analyzed;

a display; and one or more hardware processors configured to:

acquire the sensing data from the plurality of sensors;

acquire pieces of input data each representing a physical quantity of a corresponding one of elements, the elements being obtained by performing discretization on data including the sensing data of an analysis area of the structure to be analyzed using a finite element method (FEM);

input the pieces of input data into an estimation model that is a finite element method-Lagrangian neural network model utilizing the FEM and an energy functional, wherein the pieces of input data include at least one of sensing data of health monitoring and performance characteristics of the analysis area;

obtain pieces of output data output by the estimation model, each of the pieces of output data being a value of the energy functional representing an energy of a corresponding one of the elements;

estimate a temporal and spatial distribution of structural deformation of the structure by using the output data;

detect an abnormality in the structure by analyzing the temporal and spatial distribution of structural deformation of the structure; and output, via the display, the temporal and spatial distribution of structural deformation and any detected abnormality.

2. The apparatus according to claim 1, wherein the one or more hardware processors are configured to learn the estimation model to minimize a difference between a gradient of each of the pieces of output data and correct answer data of a gradient.

3. The apparatus according to claim 2, wherein the one or more hardware processors are configured to learn the estimation model to minimize a difference between each of the pieces of output data and correct answer data of each of the pieces of output data.

4. The apparatus according to claim 1, wherein the estimation model is configured to:

input the pieces of input data at a first time point t; and output the pieces of output data that includes a physical quantity for each of the elements at a second time point t+Δt being next to the first time point t.

5. The apparatus according to claim 1, wherein the energy functional is an energy functional used for analysis of continuum dynamics, and the energy functional represents, with respect to each of the elements, energy calculated by stored energy, loss energy, and a given workload.

6. The apparatus according to claim 1, wherein the energy functional is an energy functional used for electromagnetic field analysis, and the energy functional represents, with respect to each of the elements, energy calculated by exothermic energy and a workload caused by an inductive current.

7. The apparatus according to claim 1, wherein the energy functional is an energy functional used for coupled analysis of a structure and a magnetic field, and the energy functional represents, with respect to each of the elements, energy calculated by elastic strain energy, kinetic energy, dissipation energy, and a workload caused by an eddy current.

8. The apparatus according to claim 1, wherein the energy functional is an energy functional used for analysis of a phase transition phenomenon, and the energy functional represents, with respect to each of the elements, energy calculated by superconductive energy, energy caused by a magnetic field, and inter-action energy.

9. The apparatus according to claim 1, wherein the energy functional is an energy functional used for analysis of electron density and hole density, and the energy functional represents, with respect to each of the elements, energy calculated by a chemical potential, defect energy, elastic strain energy, gradient energy, crystallographic energy, and a workload from external stress for each of the elements.

10. The apparatus according to claim 1, wherein the one or more hardware processors are configured to calculate, from the pieces of output data, an index representing an abnormality of the analysis area.

11. An analysis method implemented by a computer, the method comprising:

acquiring sensing data from plurality of sensors disposed at a plurality of sample points of a structure to be analyzed;

acquiring pieces of input data each representing a physical quantity of a corresponding one of elements, the elements being obtained by performing discretization on data including the sensing data of an analysis area of the structure to be analyzed using a finite element method (FEM);

inputting the pieces of input data into an estimation model that is a finite element method-Lagrangian neural network model utilizing the FEM and an energy functional, wherein the pieces of input data include at least one of sensing data of health monitoring and performance characteristics of the analysis area;

obtaining pieces of output data output by the estimation model, each of the pieces of output data being a value of the energy functional representing an energy of a corresponding one of the elements;

estimating a temporal and spatial distribution of structural deformation of the structure by using the output data;

detecting an abnormality in the structure by analyzing the temporal and spatial distribution of structural deformation of the structure; and outputting, via a display, the temporal and spatial distribution of structural deformation and any detected abnormality.

12. A computer program product comprising a non-transitory computer-readable recording medium on which an executable program is recorded, the program instructing a computer to:

acquire sensing data from plurality of sensors disposed at a plurality of sample points of a structure to be analyzed;

acquire pieces of input data each representing a physical quantity of a corresponding one of elements, the elements being obtained by performing discretization on data including the sensing data of an analysis area of the structure to be analyzed using a finite element method (FEM);

input the pieces of input data into an estimation model that is a finite element method-Lagrangian neural network model utilizing the FEM and an energy functional, wherein the pieces of input data include at least one of sensing data of health monitoring and performance characteristics of the analysis area;

obtain pieces of output data output by the estimation model, each of the pieces of output data being a value of the energy functional representing an energy of a corresponding one of the elements;

estimate a temporal and spatial distribution of structural deformation of the structure by using the output data;

detect an abnormality in the structure by analyzing the temporal and spatial distribution of structural deformation of the structure; and output, via a display, the temporal and spatial distribution of structural deformation and any detected abnormality.

13. The apparatus according to claim 1, wherein each of the pieces of correct answer data includes a value of the energy functional, the value being numerically calculated using one of the pieces of input data for learning that represents the physical quantity of the corresponding one of the elements.

14. The apparatus according to claim 1, wherein the estimation model is learned by pieces of learning data including pieces of correct answer data and pieces of input data for learning, each of the pieces of input data for learning representing the physical quantity of a corresponding one of the elements.

* * * * *